Sept. 7, 1937.  R. I. HUFFMAN  2,092,313
OPEN END HANDLE SUPPORT FOR SADIRONS
Filed March 5, 1936
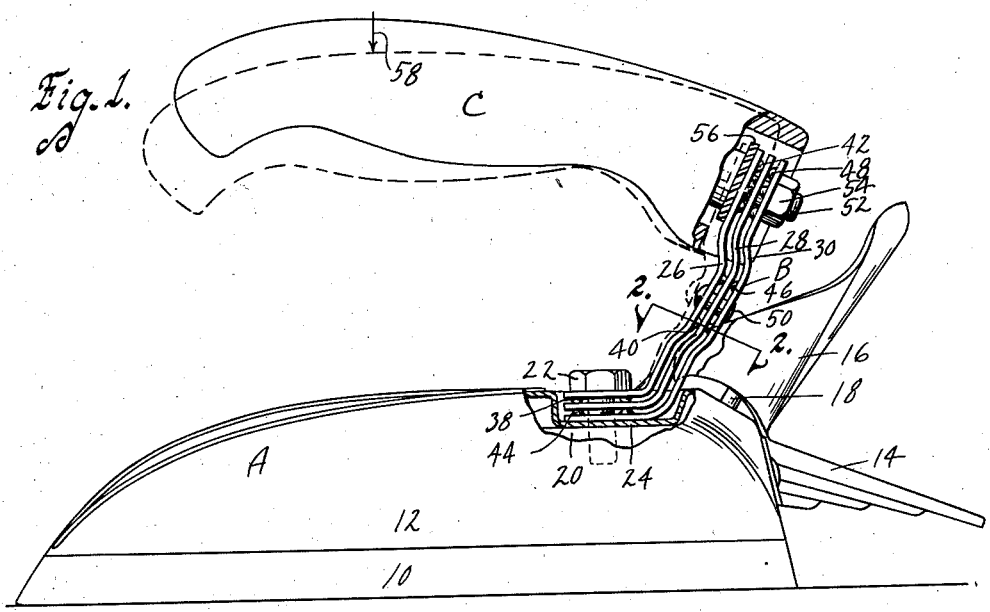
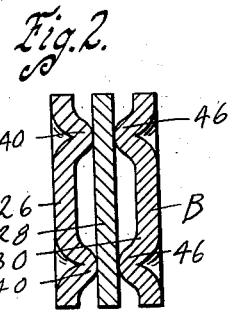
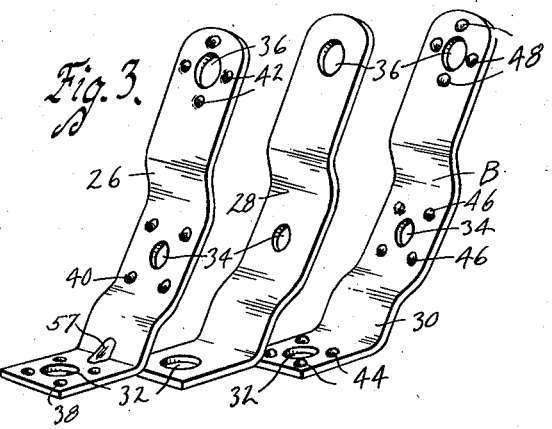
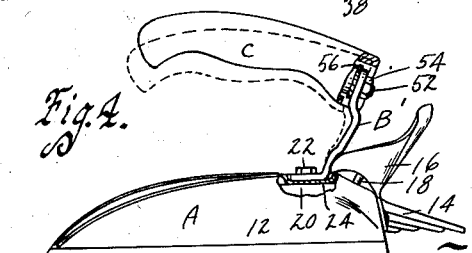
Inventor
Russell I. Huffman
by Bair, Freeman & Sinclair
Attorneys
Witness
H. S. Munzenmaier Patented Sept. 7, 1937

2,092,313

UNITED STATES PATENT OFFICE 2,092,313

OPEN END HANDLE SUPPORT FOR SAD-IRONS

Russell I. Huffman, Dover, Ohio, assignor, by mesne assignments, to Knapp-Monarch Company, St. Louis, Mo., a corporation of Missouri Application March 5, 1936, Serial No. 67,295

7 Claims. (Cl. 38—90)

An object of my invention is to provide a handle support of simple, durable and inexpensive construction especially adapted for supporting an open end handle on a sadiron.

A further object is to provide such a support formed of resilient material whereby a distinct advantage is obtained in the use of a sadiron by eliminating mechanical shock experienced with the use of sadirons having an inflexibly mounted handle, thus minimizing fatigue to the operator in the use of a sadiron.

A further object is to laminate the handle support and space the laminae apart so that the support is ventilated and cooled, and thereby substantially prevent transmission of heat from the sadiron to the handle with the result that the handle is thus always maintained cool.

Still a further object is to provide a handle support for a sadiron which will permit dropping of the sadiron on the handle, when the handle is of the open end type, without any danger of breaking the handle or the handle support, this being accomplished by forming the handle support of resilient material.

With these and other objects in view, my invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of a sadiron, an open end handle and my handle support assembled together, parts of the sadiron and handle being broken away and other parts thereof being shown in section to illustrate the connection of the handle support to the iron and handle.

Figure 2 is an enlarged sectional view on the line 2—2 of Figure 1.

Figure 3 is a perspective view of the handle support showing the parts thereof in separated position; and Figure 4 is a side elevation on a reduced scale showing a handle support which is not laminated, the support in Figure 1 being of laminated construction.

On the accompanying drawing, I have used the reference character A to indicate generally a sadiron, B a handle support and C a handle. The sadiron A includes a sole plate 10, a casing 12 and a support comprising parts 14 and 16 for the iron when in up-ended position. The part 16 also serves as a guard for the terminals 18 and the iron cord plug in the usual manner.

The usual weight member or interior frame work of the sadiron A is indicated at 20. A bolt 22 extends into it for retaining the handle support B in position. The shell 12 is depressed as at 24 to receive the foot portion of the handle support B.

The handle support B comprises a plurality of laminae 26, 28 and 30. These are preferably formed of a special analysis tempered steel, thus assuring permanence of hardness and spring characteristics at the normal operating temperature of the iron. The laminae are formed of flat strip material while in annealed state before it is tempered. The lower end of each laminae is provided with a foot portion perforated as at 32 to receive the attaching bolt 22.

Suitable means is preferably provided for keeping the laminae separated when in assembled position for the purpose of ventilation and cooling of the handle support B.

By way of illustration, I show projections formed by indenting the upper and forward faces of the lamina 26 as indicated at 38, 40 and 42, and by similarly indenting the lower and rear faces of the lamina 30, to provide projections 44, 46 and 48. Thus when the laminae 26, 28 and 30 are assembled together, as in Figure 1, the projections 38, 40, 42, 44, 46 and 48 space them apart.

The laminae 26, 28 and 30 intermediate their ends are provided with perforations 34, and are provided at their upper ends with perforations 36. The perforations 34 are adapted to receive a rivet 50, while the perforations 36 are adapted to receive a shank 52 of a lag screw or the like projecting from the handle C. A nut 54 is then screwed on the shank 52, a lock washer 56 being interposed between the rear end of the handle and the support B. The rivet 50 need not necessarily be used.

The number of laminae, the method of spacing, the method of strengthening as by one or more ribs 57, and the mounting of the handle support relative to the sadiron and the handle, may be varied considerably, yet retain the objects sought of a resilient and ventilated handle support for an open end handle.

The construction of the support in laminated form both adds to the resiliency and to the effectiveness in preventing transmission of heat from the sadiron to the handle.

The handle C is preferably inclined upwardly and forwardly, as shown by solid lines in Figure 1, to such an extent that when the normal ironing pressure is applied to the iron, it will move downwardly as indicated by the arrow 58 and assume the dotted position, which is the best angle for ironing operations.

The resiliency of the handle is a decided advantage for providing a mechanical shock absorber characteristic by permitting slight flexibility of the handle in operation, which takes up the shock which would otherwise be felt by the operator due to setting the iron on the piece being ironed and in applying pressure to an iron having a handle rigid relative to the iron, so that it cannot give toward the iron as pressure is applied. This results in a better balance for pressure leverage and increased ease in performing ironing operations. Those who have actually used the iron, experienced much less fatigue from the use of this type of iron than they do from the ordinary type.

With a support such as B' shown in Figure 4 of the proper resiliency and strength, the support need not be laminated, yet will accomplish all the desirable results of resilient mounting for an open end handle. This type of support is entirely feasible, although it is not as well ventilated as when the support is formed of laminated construction, as shown in Figure 1.

Some changes may be made in the construction and arrangement of the parts of my device without departing from the real spirit and purpose of my invention, and it is my intention to cover by my claims, any modified forms of structure, use of mechanical equivalents, or equivalent method, which may be reasonably included within their scope.

I claim as my invention:

1. In an open end handle support for sadirons, the combination of a sadiron and an open end handle with a support for connecting one end of said handle to said sadiron comprising a laminated elongated member, means for spacing the laminae thereof apart, said elongated member having a foot portion secured to said iron and an upstanding portion secured at its upper end to said handle, said elongated member being resilient to permit downward flexing of said handle, and said handle being inclined upwardly and forwardly relative to said sadiron, the degree of inclination being such that upon normal ironing pressure being applied to the handle it will assume an inclination relative to said iron most suitable for ironing operations.

2. In an open end handle support for sadirons, the combination of a sadiron and an open end handle with a support for connecting one end of said handle to said sadiron comprising a laminated elongated member, said elongated member having a foot portion secured to said iron and an upstanding portion secured to said handle, said elongated member being resilient to permit downward flexing of said handle and said handle being inclined upwardly and forwardly relative to said sadiron, the degree of inclination being such that upon normal ironing pressure being applied to the handle it will assume an inclination relative to said iron most suitable for ironing operations.

3. In a device of the class described, the combination of a sadiron, an open end handle and means of connection between one end of said handle and said sadiron comprising an L-shape resilient element having one end connected to said handle and its other end connected to said iron, said element permitting downward flexing of said handle during ironing operation while ironing pressure is being applied thereto, said element being of laminated construction, and the laminae thereof being spaced apart to provide ventilation therebetween and thereby cooling of said means of connection.

4. In a device of the class described, the combination of a sadiron, an open end handle and means of connection between one end of said handle and said sadiron comprising a resilient element having one end connected to said handle and its other end connected to said iron, said element permitting downward flexing of said handle during ironing operation while ironing pressure is being applied thereto, said element comprising a plurality of laminae and projections on at least one of said laminae to space them apart for ventilation and air cooling purposes.

5. In combination with a sadiron and an open end handle therefor, means for supporting said handle on said sadiron comprising a resilient laminated support having one end secured to said sadiron and the other end secured to one end only of said handle and means for spacing the laminae thereof apart.

6. In combination with a sadiron and a handle therefor, means for supporting said handle on said sadiron comprising a resilient laminated support having one end secured to said sadiron and the other end secured to one end of said handle and means for spacing the laminae thereof apart, said means comprising projections on at least one of said laminae adjacent the point of connection of the support to the iron and the handle.

7. In combination with a sadiron and a handle therefor, means for supporting said handle on said sadiron comprising a resilient laminated support having one end secured to said sadiron and the other end secured to one end of said handle and means for spacing the laminae thereof apart, said means comprising projections on at least one of said laminae adjacent the point of connection of the support to the iron and the handle, and additional projections on at least one of said laminae intermediate said points of connection and a fastening element through the support adjacent said additional projections.

RUSSELL I. HUFFMAN.